United States Patent [19]

Masuda et al.

[11] Patent Number: 4,872,548
[45] Date of Patent: Oct. 10, 1989

[54] INTERMITTENTLY-DRIVEN BELT CONVEYOR

[75] Inventors: Satoru Masuda, Yokohama; Hiroyuki Ishigami, Tokyo, both of Japan

[73] Assignee: Otsuka Koki Kabushiki Kaisha, Japan

[21] Appl. No.: 247,438

[22] Filed: Sep. 6, 1988

Related U.S. Application Data

[63] Continuation of Ser. No. 37,635, Apr. 13, 1987, abandoned.

[30] Foreign Application Priority Data

Jun. 5, 1986 [JP] Japan .................................. 61-131020

[51] Int. Cl.⁴ .............................................. B65G 23/38
[52] U.S. Cl. ..................................... 198/859; 198/858
[58] Field of Search ..................... 198/858, 859, 860.1, 198/860.3

[56] References Cited

U.S. PATENT DOCUMENTS

| | | | |
|---|---|---|---|
| 2,720,963 | 10/1955 | Stanley et al. | 198/859 X |
| 2,736,419 | 2/1956 | Ferno | 198/859 X |
| 3,082,859 | 3/1963 | Hagner et al. | 198/859 X |
| 3,860,108 | 1/1975 | Farfaglia | 198/859 X |
| 4,116,328 | 9/1978 | Horvath et al. | 198/859 X |
| 4,189,279 | 2/1980 | Anderson | 198/859 X |
| 4,286,707 | 9/1981 | Menzier | 198/859 |
| 4,463,944 | 8/1984 | Grantham | 198/859 X |

Primary Examiner—Robert J. Spar
Assistant Examiner—D. Glenn Dayoan
Attorney, Agent, or Firm—Lowe, Price, LeBlanc, Becker & Shur

[57] ABSTRACT

A belt conveyor having two rollers supported at opposite ends of a support frame and a belt stretched between the rollers, in which a cylinder having an operating rod reciprocatable in a moving direction of the belt is mounted on the support frame; a drum including a one way clutch mechanism therein and having a sprocket wheel fixed therearound is fitted around a transmission shaft integral with one of the rollers; a chain is wound around the sprocket wheel mounted around the drum including the one way clutch mechanism therein; and the chain is connected to the operating rod of the cylinder.

When the operating rod of the cylinder reciprocates, the chain is reciprocated by the operating rod. This reciprocatingly rotates the sprocket wheel mounted on the drum in which the one way clutch mechanism is installed. The rotation in a predetermined direction is transmitted, through the one way clutch mechanism, to the transmission shaft of the roller around which the belt is wound. The roller then rotated intermittently in one direction and the belt is fed intermittently.

6 Claims, 4 Drawing Sheets

INTERMITTENTLY-DRIVEN BELT CONVEYOR

This application is a continuation of application Ser. No. 037,635, filed Apr. 13, 1987 now abandoned.

Field of the Invention

This invention relates to a belt conveyor in which a belt is trained over two rollers supported at opposite ends of a support frame and which is capable of feeding the belt intermittently.

Prior Arts

Conventional belt conveyors, in general, are driven by a motor through a belt trained over rollers.

The conventional belt conveyor of this type, however, has such a problem that the entire weight and thickness of the conveyor are increased because of a motor mounted on the conveyor as a drive source.

This conventional belt conveyor is also disadvantageous when it is required to synchronize the motor with a machine for intermittently feeding the belt by a given length, for example, in a press working: a complicated control circuit for controlling the motor is needed and therefore the manufacturing cost of the conveyor is increased.

The present invention has been made to obviate the problems involved in the conventional belt conveyors as described above. It is an object of the present invention to provide a belt conveyor which is capable of feeding the belt intermittently without using a motor as a drive source, reducing the entire weight and thickness of the conveyor and capable of easily synchronizing the intermittent feeding operation of the belt with the operation of a machine.

SUMMARY OF THE INVENTION

In accordance with the present invention, there is provided a belt conveyor having two rollers supported at opposite ends of a support frame and a belt trained over and stretched between the rollers and adapted to feed the belt intermittently. In the belt conveyor, a cylinder has an operating rod and it is mounted on the support frame so that the operating rod may reciprocate in a moving direction of the belt. A drum includes a one way clutch mechanism therein and has a sprocket wheel fixed therearound. The drum is fitted around a transmission shaft integral with one of the rollers. A chain is trained over the sprocket wheel mounted on the drum which includes the one way clutch mechanism therein. The chain is connected to the operating rod of the cylinder.

Thus, it will be seen that when the operating rod of the cylinder reciprocates, the chain is then reciprocated by the operating rod. This reciprocatingly rotates the sprocket wheel on the drum having the one way clutch mechanism therein in alternating direction. Only the rotation in a predetermined direction is transmitted, through the one way clutch mechanism, to the transmission shaft of the roller around which the belt is wound. The roller is thus rotated intermittently in one direction and the belt is fed intermittently.

BRIEF DESCRIPTION OF THE DRAWINGS

FIG. 1 is a partly cut-away exploded perspective view of a belt conveyor; FIG. 2 is a plan view of the belt conveyor shown in FIG. 1; FIG. 3 is a partly cut-away side elevational view of a principal portion of the belt conveyor; FIG. 4 is a partly cut-away side elevational view of a drum containing a one way clutch mechanism therein; and FIG. 5 is a partly cut-away enlarged sectional view of a principal portion of the drum;

DESCRIPTION OF PREFERRED EMBODIMENT

Figure 1:
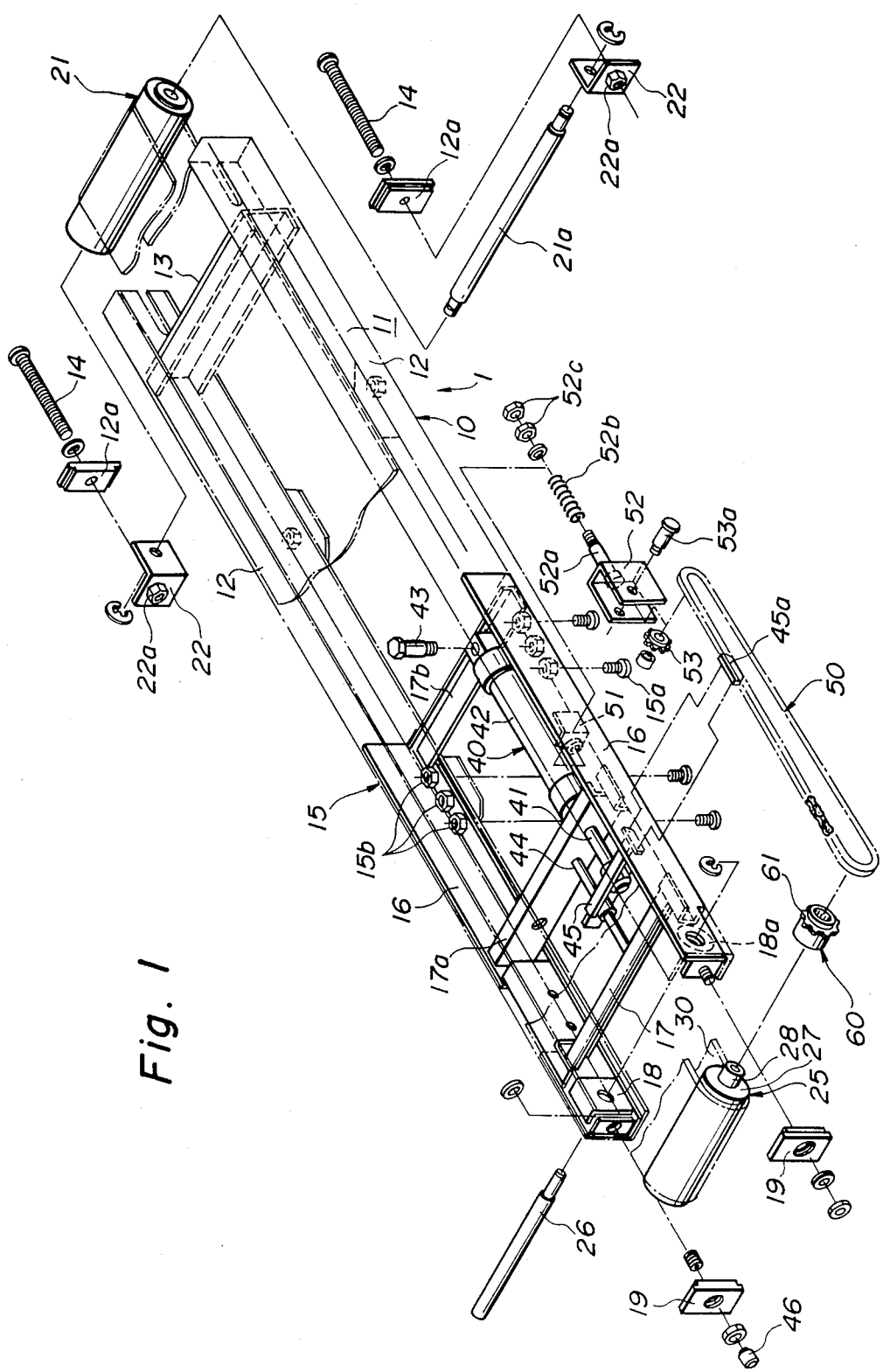
FIGS. 1 to 5 illustrate one embodiment of the present invention.

Referring to FIGS. 1 to 5, one preferred embodiment of the present invention is illustrated.

A belt conveyor 1 according to this embodiment comprises a support frame 10, two rollers 21, 25 supported at opposite ends of the support frame 10, a belt 30 stretched between and trained over the rollers 21, 25, a cylinder 40 disposed so that its operating rod 41 may reciprocate in a moving direction of the belt 30 and a chain 50 disposed along the cylinder 40.

The support frame 10 comprises an extension frame 11 and a drive section frame 15 which are fixed to each other.

The extension frame 11 is formed of a pair of longitudinal frame members 12, 12 arranged in parallel with each other and connected to each other by a transversal frame member 13. A driven or follower roller 21 is rotatably supported at an end of each of the longitudinal frame members 12, 12 through a pivotal shaft 21a. Pivotally supporting brackets 22, 22 are fitted at opposite ends of the roller 21, respectively. Each of the brackets 22 has a nut 22a welded thereto. A cap plate member 12a is fitted to the end of each longitudinal frame member 12. A tension adjusting bolt 14 is passed through the cap plate member 12a and threadedly engaged with the welded nut 22a.

The drive section frame 15 is formed of a pair of longitudinal frame members 16, 16 which are connected by transversal frame members 17, 17a, 17b. One end of the drive section frame 15 is fitted in the extension frame 11 and firmly fixed thereto with bolts 15a, 15a, etc. and nuts 15b, 15b, etc.

At another end of the drive section frame 15, pivotal support brackets 18, 18a are fixed to the longitudinal frame members 16, 16, respectively. A pivotal shaft 26 pivotably supporting the driving roller 25 is disposed between the pivotal support brackets 18, 18a. Cover plate members 19, 19 are fitted to ends of the longitudinal frame members 16, 16, respectively.

The driving roller 25 is provided with a drum 27 around which the belt 30 is passed. The drum 27 has a transmission shaft 28 formed integrally therewith.

The cylinder 40 may, for example, be a single-acting air cylinder. An air coupler 46 for supplying air to the cylinder 40 is fixed to one of the cover plate member 19 of the driving section frame 15 and connected to a cylinder member 42 of the cylinder 40 through pipes (not shown).

The chain 50 is supported by the following mechanism in which a support bracket 51 is fixed at an intermediate portion of the longitudinal frame member 16 and a holding member 52 is coupled to the support bracket 51 through a tension bolt 52a. A spring 52b is interposed between the holding member 52 and the support bracket 51. The tension bolt 52a is set by double nuts 52c so as not to be dislocated.

In the holding member 52, a chain sprocket wheel 53 is rotatably mounted by a pivotal pin 53a.

A drum 60 including a one way clutch mechanism therein is fitted around the transmission shaft 28 of the driving roller 25. The drum 60 has a chain sprocket wheel 61 therearound. The chain 50 is stretched between the sprocket wheel 61 provided around the drum 60 and the sprocket wheel 53 mounted in the holder member 52. A connecting plate 45a, which is provided at an end of a moving member 45 connected to the operating rod 41 of the cylinder 40, is inserted or fixed at an intermediate portion of the chain 50.

As can be seen from FIGS. 4 and 5, the drum 60 has an inner surface with a plurality of recesses 62 each consisting of a loose portion 62a for allowing rotation of a needle roller 63 as will be described in detail later and a gripping portion 62b for gripping the needle roller thereby. The needle roller 63 is fitted in each of the recesses 62 and the roller 63 is held by an inner race 64.

An arc given by an envelope formed by the inner ends of the needle rollers 63 is selected so that it may fit around the transmission shaft 28 of the driving roller 25. The recesses 62, the needle rollers 63 and the transmission shaft 28 constitute the one way clutch mechanism.

The operation of this embodiment will now be described.

The support frame 10 is adjusted in length by changing the extended length of the extension frame 11 so as to have a length required. The tension adjusting bolt 14 is tightened or loosened to adjust the tension of the belt 30 and the tension bolt 52a is tightened or loosened to adjust the tension of the chain 50.

Figure 2:
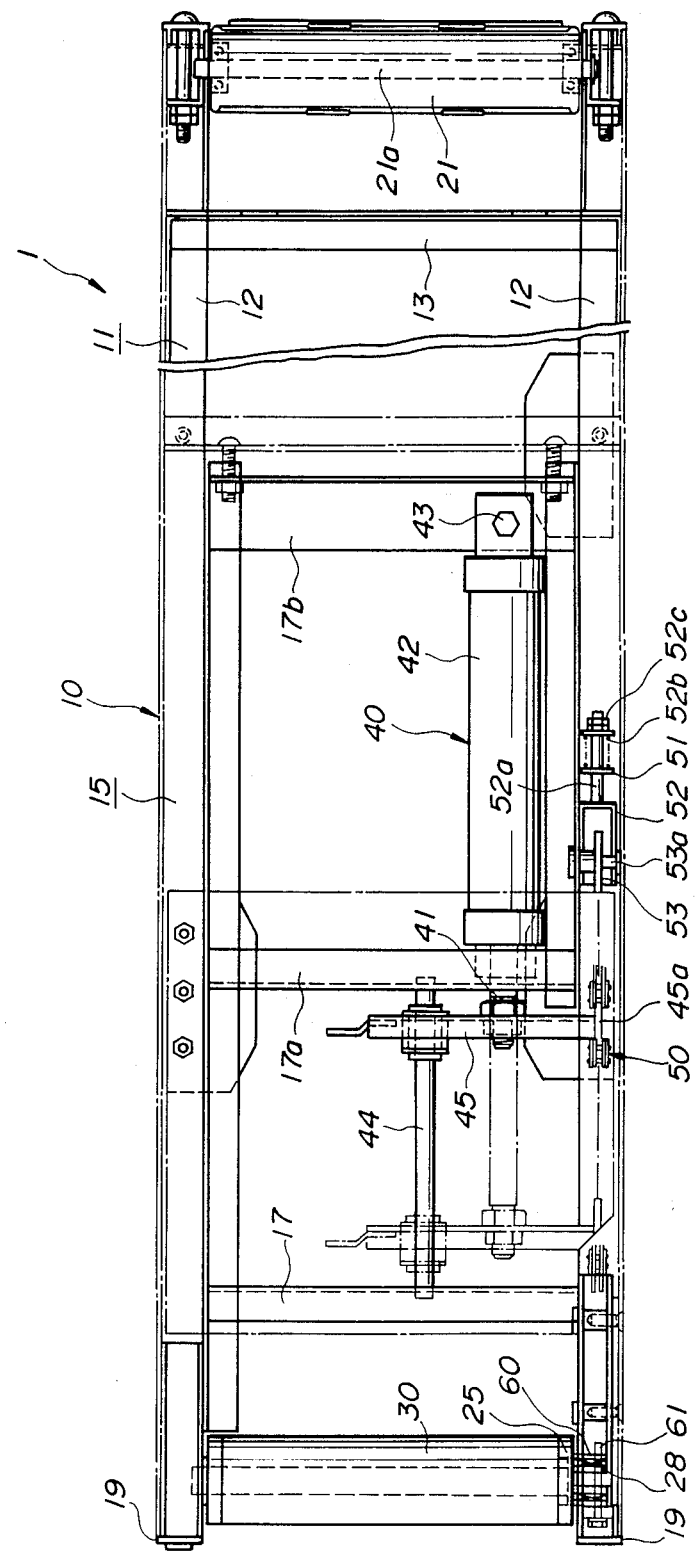

Air is supplied to the cylinder member 42 of the cylinder 40 by an air control mechanism (not shown) through the air coupler 46 when the operating rod 41 of the cylinder 40 is in its retired position as illustrated in FIGS. 1 and 2. As a result of this, the operating rod 41 jerks against the action of a spring installed within the cylinder 40 and, at a same time, the moving member 45 connected to the operating rod 41 moves leftwardly as viewed in FIG. 2 while being guided by a guide rod 44.

When the moving member 45 moves in the leftward direction from the position as shown in FIG. 2, the connecting plate 45a is moved conjointly in the leftward direction, which, in turn, drives the chain 50 leftwardly. The leftward movement of the chain 50 rotates the drum 60 counterclockwise as viewed in FIGS. 3 to 5 through the sprocket wheel 61.

The driving roller 25 and the transmission shaft 28 tends to remain where they are, due to the force of inertia, when the drum 60 starts to rotate. The resultant relative displacement puts the needle rollers 63 into the gripping portions 62b of the recesses, respectively, and the needle rollers are firmly held between the gripping portions 62a and the surface of the transmission shaft 28 by the wedge grip. As a result of this, the drum is firmly locked relative to the transmission shaft 28. In this state, the transmission shaft 28 is rotated by the drum 60 to feed the belt 30.

When the operating rod 41 of the cylinder 40 is jerked to a position as shown by a phantom line in FIG. 2 to feed the belt 30 by a predetermined stroke, the air supply by the air control mechanism is stopped and air supplied to the cylinder 40 is drawn out to allow the operating rod 41 to retreat from the jerked position against the action of a spring installed within the cylinder member 42.

Figure 3:
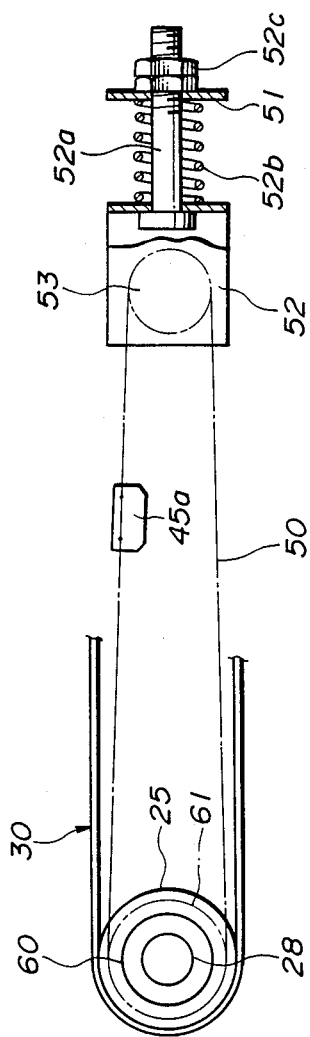
Figure 5:
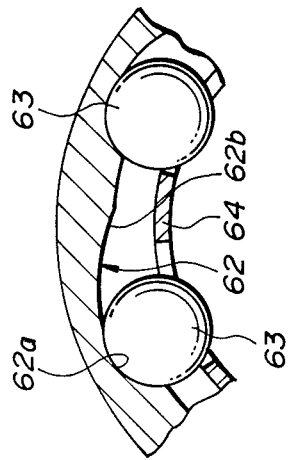
Figure 4:
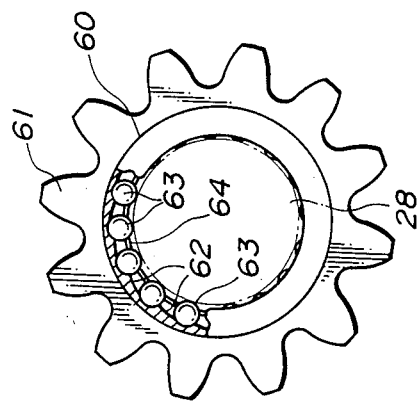

As the operating rod 41 retreats, the chain 50 is moved in the opposite direction and the drum 60 is rotated clockwise as viewed in FIGS. 3 to 5.

Against the rotation of the drum 60, the driving roller 25 and the transmission shaft 28 tends to remain due to the force of inertia in a direction opposite to that in the preceding feeding driving. As a result of this, the needle rollers 63 are moved to the loose portions 62a of the respective recesses 62. This releases the wedge grip of the needle rollers 63 to allow the needle rollers 63 to rotate freely. The drum 60 is, therefore, raced or idly rotated relative to the transmission shaft 28 and the driving roller 25 is never rotated.

When the operating rod 41 of the cylinder 40 is retired to the position shown by a solid line in FIG. 2, the air control mechanism again starts to supply air to the cylinder member 42. The operating rod 41 is then jerked to feed the belt 30 as described above.

These operations are repeated to feed the belt 30 intermittently.

Figure 6:
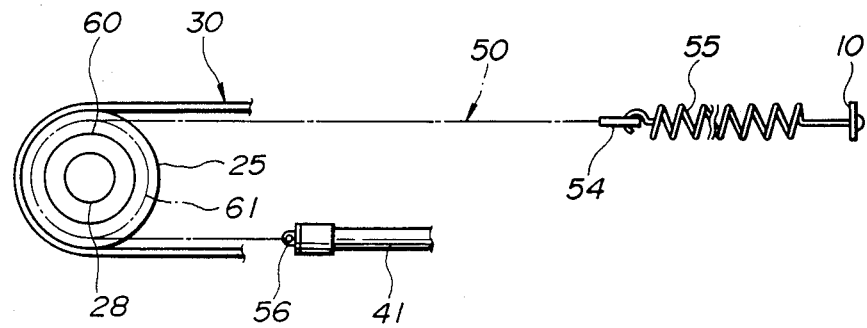
FIG. 6 is a sectional view of a principal portion of a belt conveyor according to another embodiment of the present invention.

FIG. 6 illustrates another embodiment of the present invention wherein the arrangement associated with the chain is modified. An intermediate portion of the chain 50 passes around the sprocket wheel 61 mounted on the drum having the one way clutch mechanism. One end 54 of the chain 50 is fixed to the support frame 10 through a stretchable strap member, i.e., a relatively long coil spring 55. The other end 56 of the chain 50 is connected to the operating rod 41 of the cylinder 40.

Figure 7:
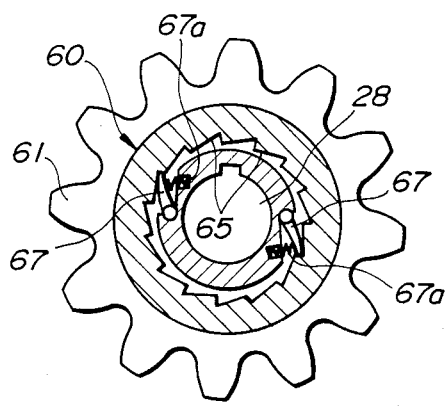
FIG. 7 is a sectional view of a drum including another form of one way clutch mechanism according to the present invention.

FIG. 7 illustrates another form of the one way clutch mechanism. The drum 60 has a ratchet 65 formed on the inner surface thereof. Pawl members 67 pivotably mounted on an inner cylindrical member 66 which is rotatable inside the ratchet 65. The pawl members 67 are biased by springs 67a to mesh with teeth of the ratchet 65. The transmission shaft 28 of the driving roller 25 is inserted into the inner cylindrical member 66 through a key way and tightly fitted therein so as not to rotate relative thereto.

In this case, when the drum 60 rotates counterclockwise, the rotation force is transmitted to the transmission shaft 28, whereas when the drum 60 rotates clockwise, the drum 60 is raced or idly rotated.

According to the present invention, the belt is intermittently fed by the linear reciprocating motion of the cylinder without using a motor. Therefore, the total weight and thickness of the conveyor are reduced as compared with the conventional conveyor belt using a motor as a drive source. In addition, the intermittent feeding of the belt can more easily be synchronized, in the present belt conveyor, with the operation of a machine. Thus, the manufacturing line can be rationalized to improve the efficiency of the line.

What is claimed is:

1. A belt conveyor comprising a support frame established by side body members, two rollers supported on one side body members at opposite ends of the support frame, a belt stretched between the rollers and means for feeding the belt intermittently, said feeding means including:

a cylinder having an opening rod reciprocatable in a moving direction of the belt, said cylinder mounted within said support frame between said side body members and between upper and lower runs of the belt;

a drum including a one way clutch mechanism therein and having a sprocket wheel mounted therearound fitted around a transmission shaft integral with one of the rollers;

a chain trained over said sprocket wheel mounted around the drum including the one way clutch mechanism therein;

said chain connected to the operating rod of the cylinder to transmit movement to the transmission shaft through the drum and one way clutch mechanism via the sprocket wheel, wherein said cylinder has a longitudinal axis extending substantially parallel to the body members and is formed with a diameter approximately less than the height of said body members, said cylinder being further located between opposite ends of said body members.

2. A belt conveyor according to claim 1, further comprising a sprocket wheel mounted on the support frame at a position spaced from the sprocket wheel mounted around the drum and wherein said chain is stretched between the two sprocket wheels in a loop.

3. A belt conveyor according to claim 1, wherein said chain is wound, at an intermediate portion thereof, around said sprocket wheel mounted on the drum and said chain is fixed, at one end thereof, to the support frame and connected, at another end thereof, to the operating rod of the cylinder.

4. A belt conveyor according to claim 1, wherein said one way clutch mechanism comprises a plurality of recesses each consisting of a loose portion and a gripping section formed on an inner surface of the drum and a plurality of needle rollers fitted in said recesses, respectively and rollable on the outer periphery of the transmission shaft.

5. A belt conveyor according to claim 1, wherein said one way clutch mechanism comprises a ratchet formed on an inner surface of the drum and at least one pawl meshable with teeth of said ratchet.

6. A belt conveyor comprising a support frame defined by at least a pair of side body members, two rollers supported on the side body members at opposite ends of the support frame and a belt stretched between the rollers and means for feeding the belt intermittently, said feeding means including:

a cylinder having an operating rod, said cylinder being mounted on said support frame between upper and lower runs of the belt so that the operating rod may reciprocate in a moving direction of the belt;

a transmission shaft integral with one of said rollers;

a drum including a one way clutch mechanism therein and having a sprocket wheel mounted therearound, said drum being fitted around said transmission shaft; and a chain wound around said sprocket wheel mounted on the drum including the one way clutch mechanism therein;

said chain connected to the operating rod of the cylinder, to transmit movement to the transmission shaft through the drum and one way clutch mechanism via the sprocket wheel, wherein said cylinder is mounted within the frame between the side body members.

* * * * *